US012662288B2

(12) United States Patent
Berk et al.

(10) Patent No.: US 12,662,288 B2
(45) Date of Patent: Jun. 23, 2026

(54) PULP CONTAINER WITH FUSED JUNCTION AND METHOD OF MAKING SAME

(71) Applicant: LGAB LLC, Boca Raton, FL (US)

(72) Inventors: Adam Berk, Boca Raton, FL (US); Lee Green, Boca Raton, FL (US); Fuad Khan, Cardiff CF (GB)

(73) Assignee: LGAB LLC, Boca Raton, FL (US)

( * ) Notice: Subject to any disclaimer, the term of this patent is extended or adjusted under 35 U.S.C. 154(b) by 0 days.

(21) Appl. No.: 19/044,574

(22) Filed: Feb. 3, 2025

(65) Prior Publication Data

US 2025/0178778 A1 Jun. 5, 2025

Related U.S. Application Data

(60) Continuation of application No. 18/515,624, filed on Nov. 21, 2023, now Pat. No. 12,214,927, which is a (Continued)

(51) Int. Cl.
| | |
|---|---|
| *B65D 8/00* | (2006.01) |
| *B29C 65/08* | (2006.01) |
| *B29D 22/00* | (2006.01) |
| *B65D 25/14* | (2006.01) |
| *B65D 50/02* | (2006.01) |
| *B65D 51/18* | (2006.01) |
| *D21J 1/08* | (2006.01) |
| *D21J 3/10* | (2006.01) |
| *B29C 65/00* | (2006.01) |

(52) U.S. Cl.
CPC .............. *B65D 15/08* (2013.01); *B29C 65/08* (2013.01); *B29D 22/003* (2013.01); *B65D 25/14* (2013.01); *B65D 50/02* (2013.01);

*B65D 51/18* (2013.01); *D21J 1/08* (2013.01); *D21J 3/10* (2013.01); *B29C 66/929* (2013.01); *B29C 66/9513* (2013.01); *B65D 2251/0018* (2013.01); *B65D 2251/0093* (2013.01)

(58) Field of Classification Search
CPC .............. B25B 21/026; B25B 23/0021; B25B 23/1475
See application file for complete search history.

(56) References Cited

U.S. PATENT DOCUMENTS

| | | | | | |
|---|---|---|---|---|---|
| 4,948,006 | A | * | 8/1990 | Okabe | B65D 15/18 413/5 |
| 5,098,751 | A | * | 3/1992 | Tamura | B32B 27/32 428/35.8 |

(Continued)

FOREIGN PATENT DOCUMENTS

WO WO-2022238357 A1 * 11/2022 ............. B29C 66/54

*Primary Examiner* — Eyamindae C Jallow

(57) ABSTRACT

Molded pulp containers with fused junctions and methods of making of same are provided. The present invention provides a pulp container, comprising a molded pulp body, wherein the body comprising a bottom and at least one side wall forming a cavity, wherein the at least one side wall comprising a upper rim, a neck, wherein the neck comprising a upper closure part and a lower rim, a fused junction, wherein a part of the upper rim of the at least one sidewall of the body and a part of the lower rim of the neck are aligned and fused together. The fused junction may be formed by ultrasonic welding.

22 Claims, 10 Drawing Sheets

Related U.S. Application Data division of application No. 17/267,865, filed on Feb. 11, 2021, now Pat. No. 11,840,369.

(56)                    References Cited

U.S. PATENT DOCUMENTS

| | | | | |
|---|---|---|---|---|
| 5,281,453 | A * | 1/1994 | Yamada ..................... | B32B 1/00 |
| | | | | 220/276 |
| 5,316,603 | A * | 5/1994 | Akazawa .......... | B29C 66/81425 |
| | | | | 156/580.2 |
| 2013/0047559 | A1* | 2/2013 | Minnette ................ | B29C 65/18 |
| | | | | 53/488 |
| 2014/0166682 | A1* | 6/2014 | Huffer .............. | B29C 66/53461 |
| | | | | 220/780 |

* cited by examiner

PULP

VACUUM

PRESSURE/HEAT    DRYING TOOLS

PRESSURE/SONIC ENERGY

SONOTRODE

HOLDER

FUSED
AND TRIMMED
JUNCTION

PULP CONTAINER WITH FUSED JUNCTION AND METHOD OF MAKING SAME

CROSS-REFERENCE TO RELATED APPLICATIONS

This application is a continuation of U.S. patent application Ser. No. 18/515,624, filed on Nov. 21, 2023, patented as U.S. Pat. No. 12,214,927 on Feb. 4, 2025, which is a divisional application of U.S. application Ser. No. 17/267, 865, filed Feb. 11, 2021, issued as U.S. Pat. No. 11,840,369, on Dec. 12, 2023, which is a U.S. National Phase Application of International Patent Application No. PCT/US2020/040586, filed Jul. 2, 2020, which claims the benefit of U.S. Provisional Patent Application No. 62/870,171, filed Jul. 3, 2019, the disclosures of which are incorporated by reference in their entirety.

FIELD OF THE INVENTION

The present invention relates to molded pulp containers with fused junctions and methods of making molded pulp containers with fused junction.

BACKGROUND OF THE INVENTION

Conventional containers and bottles are typically made of petroleum-based plastics. Reacting to the rising cost of petroleum-based plastics, manufacturers of conventional plastic containers and bottles have been making bottles thinner in recent years. This trend is predicted to continue for the foreseeable future. Meanwhile, the price of pulp products having certain strength and performance attributes has stayed relatively stable. As conventional petroleum-based plastic bottles have been made thinner, their performance as measured by static load and compressive strength has often been compromised. Petroleum-based plastics also have a larger carbon footprint than pulp. As petroleum-based plastics typically do not biodegrade, while pulp do. Further, pulp is made from environmentally sustainable resources, and can be recycled easily.

There have been many recent efforts to develop containers having potential to address problems relating to the cost, performance, and environmental impact of conventional plastic containers. There are no practically biodegradable plastic bottles or containers on the market. Some bioplastics, such as polylactic acid (PLA) are made from plant sourced material, which do not use petroleum products. However, these bioplastics not yet truly biodegradable.

By incorporating pulp as a component of containers, the amount of plastic, particularly petroleum-based plastic, needed to achieve certain strength and performance is reduced, which reduced waste materials. When combined with bioplastics, the entire container becomes more sustainable.

U.S. Pat. Nos. 5,385,764 and 5,705,237 relate to a container incorporating a hydraulically settable structural matrix including a hydraulically settable binder such as cement for use in the storing, dispensing, and/or packing of food and beverage products. Disposable containers and cups are those that are particularly useful for dispensing hot and cold food and beverages in a fast food restaurant industry.

U.S. Pat. No. 6,899,793 relates to a method of manufacturing a pulp mold formed body. The method feeds a pulp slurry to a cavity of a paper making mold having a prescribed cavity shape to form a pulp pre-form including a main part having an opening and a separate part having a flange and connected to an edge of the opening. A pressing member is inserted into the pre-form; the pressing member is expanded to press the pre-form toward the paper making surface; the pre-form is removed from the paper making mold; and then the pre-form is cut at a joint between the separable part and the main part.

U.S. Pat. No. 7,048,975 relates to a pulp molded container comprising a pulp molded article having, on the inner surface and/or the outer surface, a resin with the thickness of 5-300 $\mu$m formed by applying a coating. The thickness ratio of the resin layer to the molded article is $\frac{1}{2}$ to $\frac{1}{100}$, and the surface roughness profile of the outer or inner surface of the pulp molded article is such that a center line average roughness is 0.5 to 20 $\mu$m.

U.S. Patent App. Pub. No. US 2010/0200591 (published Aug. 12, 2010), and a product manufactured by the assignee of such patent application (Greenbottle), provide a composite of pulp and a polyethylene terephthalate (PET) bladder, where the end user separates the bladder from the pulp at end of use and recycles them in their respective streams. However, if a user left the whole bottle to biodegrade it would not do so due to its PET bladder.

U.S. Pat. No. 9,505,521 relates to thermal formed pulp bottles with bioplastic neck. The bottles may be made in multiple sections and joined with adhesives or a heat sealing process.

While there have been attempts in the prior art to address the problems relating to cost, performance, and environmental impact of bottles, there remains a need for new solutions to address these issues with greater efficacy.

SUMMARY OF THE INVENTION

The invention provides a method of fabricating a pulp container comprising the steps of generating a first part shell, wherein the first part shell comprising a first rim, generating a second part shell, wherein the second part shell comprising a second rim, laminating an interior surface of at least one of the first and second part shell with a polymer film, which extends to the first and second rims, aligning the first and second part shells, wherein the first and second rims are aligned, wherein aligning the first and second part shell is to place the interior polymer film at a contact interface of the first and second rims; and ultrasonic welding the first and second rims to form a container.

The first and second part shells comprise at least a part of wood product, paper, pulp, or molded pulp. Further, the polymer film comprises at least thermoplastic and/or bioplastic. The polymer film may also comprise bio-degradable thermoplastic.

The polymer film may comprise at least one of polyethylene terephthalate (PET), polypropylene (PP), polyethylene (PE), ethylene-vinyl alcohol (EVOH), polyamide (Nylon, PA), ionomers (EAA, EMAA), ethylene vinyl acetate (EVA), polyacrylic acid (PAA), or cellulose acetate.

The first and second part shells may be formed by vacuum forming. The at least one of the first and second part shells are laminated by heating a polymer film and applying vacuum on an exterior side of the at least one of the first and second part shells.

The ultrasonic welding is typically by 0.1-6 bar of pressure, welding frequency is 15-50 KHz.

The polymer film may comprise a plurality of polymer layers. The polymer film may be metalized. The metalized layer comprises Aluminum.

The first part shell may further comprise a first depression, and the second part shell further comprising a second depression, wherein the first depression and the second depression form a cavity.

The present invention also provides a method of fabricating a pulp container, the method comprising the steps of generating a body, wherein the body comprising a bottom and at least one side wall forming a cavity, wherein the at least one side wall comprising a upper rim generating a neck, wherein the neck comprising a upper closure part and a lower rim aligning the upper rim of the at least one sidewall of the body and the lower rim of the neck, and ultrasonic welding the upper rim of the at least one sidewall of the body to the lower rim of the neck.

The ultrasonic welding is by 0.1-6 bar of pressure, welding frequency is 15-50 KHz. The ultrasonic welding also removes excess material from lower rim and neck. The ultrasonic welding utilizes a sonotrode comprising a cutting edge.

The body comprises at least a part of wood product, paper, pulp, or molded pulp.

The neck may comprise at least thermoplastic and/or bioplastic. The neck may comprise at least one of polyethylene terephthalate (PET), polypropylene (PP), polyethylene (PE), ethylene-vinyl alcohol (EVOH), polyamide (Nylon, PA), ionomers (EAA, EMAA), ethylene vinyl acetate (EVA), polyacrylic acid (PAA), or cellulose acetate.

The body may have an interior surface laminated with a polymer film, which extends to the upper rim. The polymer film may comprise a plurality of polymer layers. The the polymer film may be metalized. The metalized layer may comprise Aluminum.

The polymer film may comprise at least thermoplastic and/or bioplastic. The polymer film may comprise at least one of polyethylene terephthalate (PET), polypropylene (PP), polyethylene (PE), ethylene-vinyl alcohol (EVOH), polyamide (Nylon, PA), ionomers (EAA, EMAA), ethylene vinyl acetate (EVA), polyacrylic acid (PAA), or cellulose acetate.

The body may be formed by vacuum forming. The body may be laminated by heating the polymer film and applying vacuum on an exterior side of the body.

The present invention further provides a pulp container, comprising a molded pulp body, wherein the body comprising a bottom and at least one side wall forming a cavity, wherein the at least one side wall comprising a upper rim, a neck, wherein the neck comprising a upper closure part and a lower rim, a fused junction, wherein a part of the upper rim of the at least one sidewall of the body and a part of the lower rim of the neck are aligned and fused together. The fused junction may be formed by ultrasonic welding. The ultrasonic welding is by 0.1-6 bar of pressure, welding frequency is 15-50 KHz.

The body may comprise at least a part of wood product, paper, or pulp.

The neck may comprise at least thermoplastic and/or bioplastic. The neck may comprise at least one of polyethylene terephthalate (PET), polypropylene (PP), polyethylene (PE), ethylene-vinyl alcohol (EVOH), polyamide (Nylon, PA), ionomers (EAA, EMAA), ethylene vinyl acetate (EVA), polyacrylic acid (PAA), or cellulose acetate.

The body may have an interior surface laminated with a polymer film, which extends to the upper rim. The polymer film may comprise at least thermoplastic and/or bioplastic. The polymer film may comprise at least one of polyethylene terephthalate (PET), polypropylene (PP), polyethylene (PE), ethylene-vinyl alcohol (EVOH), polyamide (Nylon, PA), ionomers (EAA, EMAA), ethylene vinyl acetate (EVA), polyacrylic acid (PAA), or cellulose acetate. The polymer film may comprise a plurality of polymer layers. The polymer film may be metalized. The metalized layer comprises Aluminum.

The pulp container may further comprise a cap capable of engaging the upper closure part of the neck. The cap may be a childproof cap. The pulp container may further comprise a tamper proof seal.

The present invention further provides a method of joining a pulp component to a second component, comprising the steps of providing a pulp component comprising a flat first rim, providing a second component comprising a flat second rim, aligning the first rim with the second rim, wherein at least one of the first rim and the second rim comprising a polymer layer, and ultrasonic welding the first rim to the second rim.

The first rim may be coated with a polymer. The second rim may be coated with a polymer.

The second component may comprise at least a part of wood product, paper, or pulp. The second component may comprise a polymer. The polymer may comprise at least thermoplastic and/or bioplastic. The polymer may comprise at least one of polyethylene terephthalate (PET), polypropylene (PP), polyethylene (PE), ethylene-vinyl alcohol (EVOH), polyamide (Nylon, PA), ionomers (EAA, EMAA), ethylene vinyl acetate (EVA), polyacrylic acid (PAA), or cellulose acetate.

The ultrasonic welding may be by 0.1-6 bar of pressure, welding frequency is 15-50 KHz.

The ultrasonic welding may simultaneously remove excess material from the first and second rim.

BRIEF DESCRIPTION OF THE DRAWINGS

The above and other objects, aspects, features, advantages and possible applications of the present innovation will be more apparent from the following more particular description thereof, presented in conjunction with the following drawings. Like reference numbers used in the drawings may identify like components.

Figure 1A:
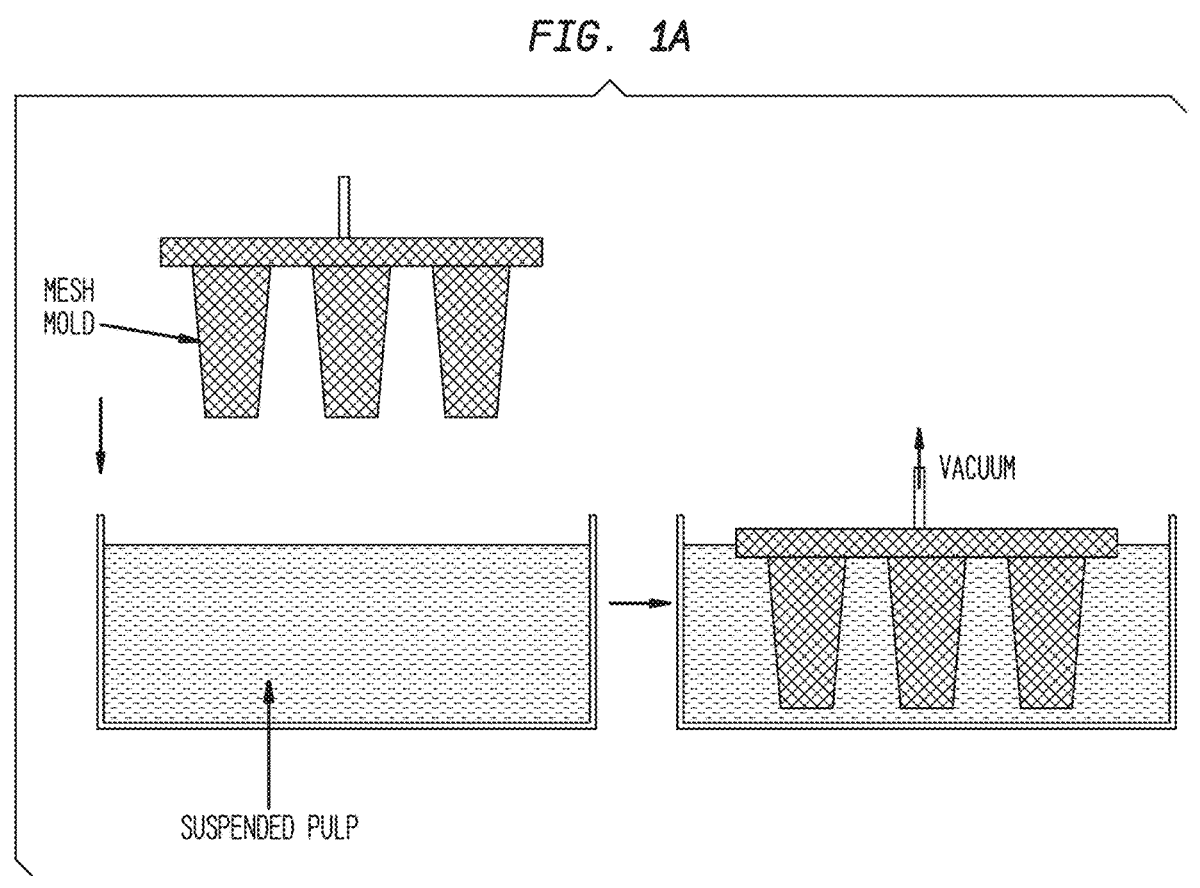
Figure 1B:
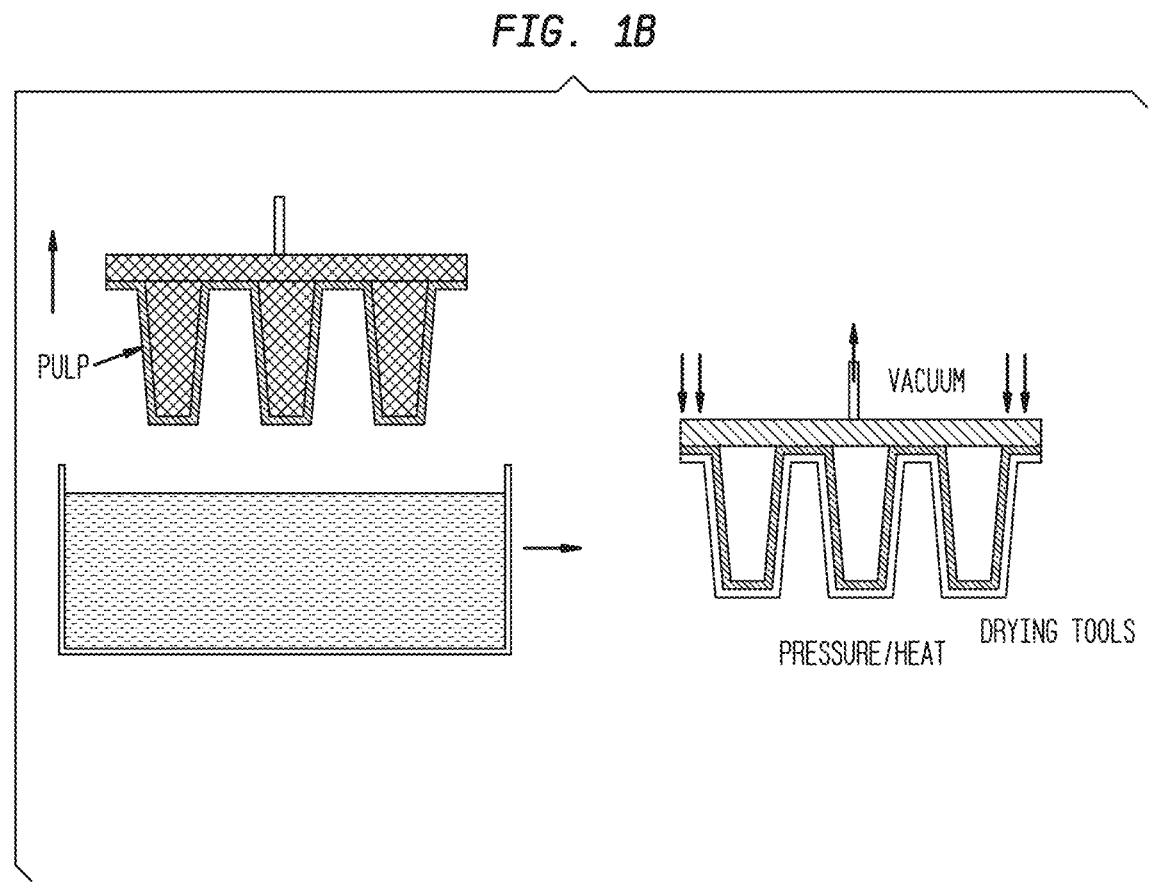

FIGS. 1A, 1B, and 1C illustrate an exemplary process of making molded pulp containers;

DETAILED DESCRIPTION OF THE INVENTION

Figure 1C:
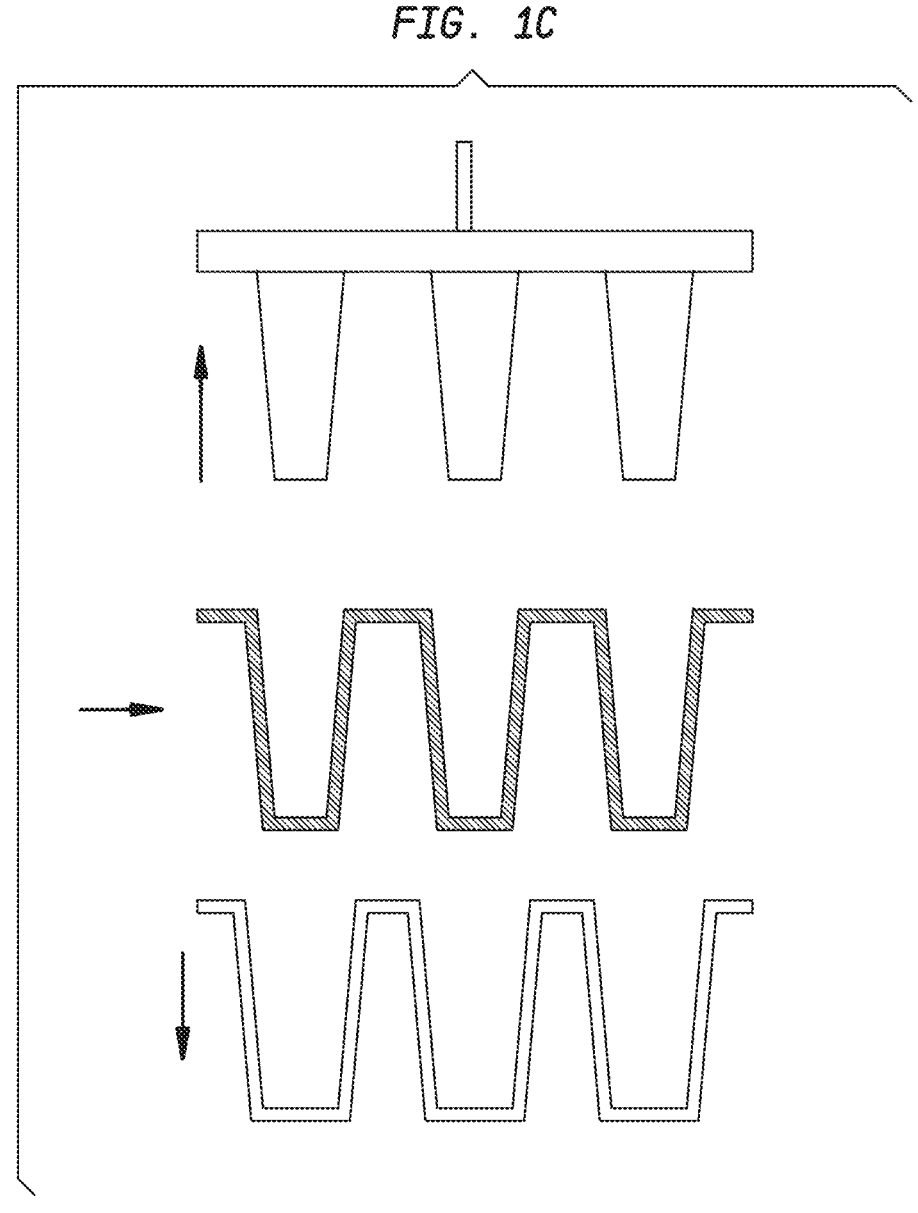

The following description is of exemplary embodiments that are presently contemplated for carrying out the present invention. This description is not to be taken in a limiting sense, but is made merely for the purpose of describing the general principles and features of the present invention. The scope of the present invention is not limited by this description.

Ultrasonic welding is an industrial technique whereby high-frequency ultrasonic acoustic vibrations are locally applied to workpieces being held together under pressure to create a solid-state weld. It is commonly used for plastics, and especially for joining dissimilar materials. In ultrasonic welding, there are no connective bolts, nails, soldering materials, or adhesives necessary to bind the materials together. Ultrasonic welding utilizing mechanical vibrations to generate heat due to molecular friction. These vibrations excite the molecules in the work piece so that they start moving. The plastic becomes soft and starts melting. The components are bonded by cohesive or form-fit joints. After a short hold time under pressure, they are firmly joined molecularly.

Although ultrasonic welding uses vibration to create a weld, ultrasonic welding is a different method from "vibration welding" (also known as friction welding). In vibration welding one material is held in place, while the other is moved back and forth by either an alternating electromagnetic or hydraulic linear motion generator. In ultrasonic welding, both materials are held in place and a high frequency sonic energy is applied to produce friction and then create a weld.

Typically, during the welding process, the materials to be welded are placed between a fixed shaped nest and a sonotrode or horn which is connected to a transducer which produces a low amplitude acoustic vibration. The acoustic energy creates friction, produces heat, and then the parts are welded together, typically in less than a second making it one of the fastest welding methods in use.

An exemplary ultrasonic welding system is composed of at least some of the basic elements listed below, which may include:

A press, usually with a pneumatic or electric drive, to assemble two parts under pressure.

A nest or anvil or fixture where the parts are placed and allowing the high frequency vibration to be directed to the interfaces.

An ultrasonic stack composed of a converter or piezoelectric transducer, an optional booster and a sonotrode, or horn. All three elements of the stack are specifically tuned to resonate at the same exact ultrasonic frequency, typically at 15, 20, 30, 35 or 40 kHz.

A converter, which converts the electrical signal into a mechanical vibration using piezoelectric effect.

A booster, which modifies the amplitude of the vibration mechanically. It is also used in standard systems to clamp the stack in the press.

Sonotrode or horn may take the shape of the part, also modifies the amplitude mechanically, and applies the mechanical vibration to the parts to be welded. The sonotrode can have a smooth or textured surface contacting the parts to be welded depending on the application.

An electronic ultrasonic generator or power supply, which delivering a high power electric signal with frequency matching the resonance frequency of the stack.

A controller controlling the movement of the press and the delivery of the ultrasonic energy.

An exemplary example of the method of fabricating a pulp container is herein described (FIG. 1A-C). A pulp shell, which may represent approximately a part of a container, is first created with typical vacuum molded process. Typically, a mesh mold is submerged in a suspended pulp, and vacuum is applied (FIG. 1A). A layer of pulp is deposited on the exterior of the mesh mold. The mesh mold is then withdrawn from the suspended pulp. Excess water is removed by continue applying vacuum. The pulp layer while still adhere to the mesh mold is then placed into a complementary mold. The pulp layer is removed from the mesh mold and transferred between a set of male/female heated drying tools, which close to generate pressure (FIG. 1B). The drying tools are then separated, and the formed pulp shell ejected from drying tools (FIG. 1C). The formed pulp shell may comprise a first depression and a first rim. A second pulp shell may be produced by the same process as described above (FIG. 1A-1C). The second shell may comprise a second depression and a second rim. This first and second shell can be made to complement each other, e.g., the first depression and the second depression can be placed facing each other.

When the first and second part shells are aligned, the first and second depressions form a cavity, and the first and second rims are aligned, e.g., facing each other and make contact. The first and second rims are then welded to form a container.

A preferred method for welding the first and second rims is by ultrasonic welding. The first and second rims are stacked. Ultrasonic energy is applied via a sonotrode pressing against the stacked first and second rims and an anvil. Ultrasonic energy is applied for a period time sufficient for the welding of the first and second rims, typically for 1-60 seconds. Ultrasonic energy and duration depends on the sonotrode and size of the work piece. Typically, 0.1-6 bar of pressure, welding frequency is 15-50 KHz. Ultrasonic welding forms a fused junction between the first and second shells.

In an embodiment of the invention, the first and second part shell may have interior surfaces laminated with a polymer film, which extends to the first and second rims.

Figure 2A:
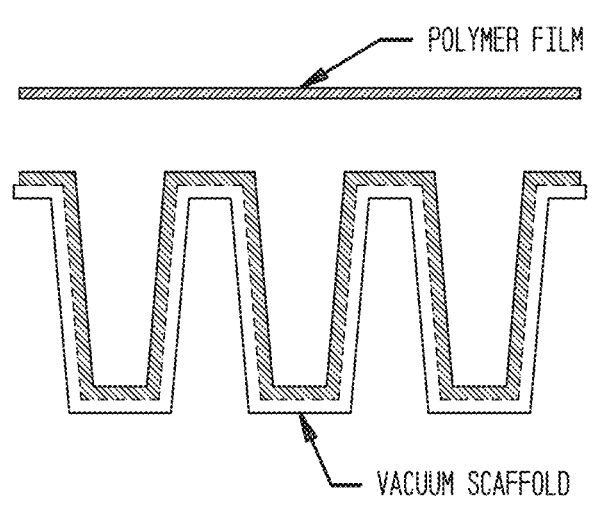
FIGS. 2A and 2B illustrate an exemplary process of laminating a polymer layer to molded pulp containers.
Figure 2B:
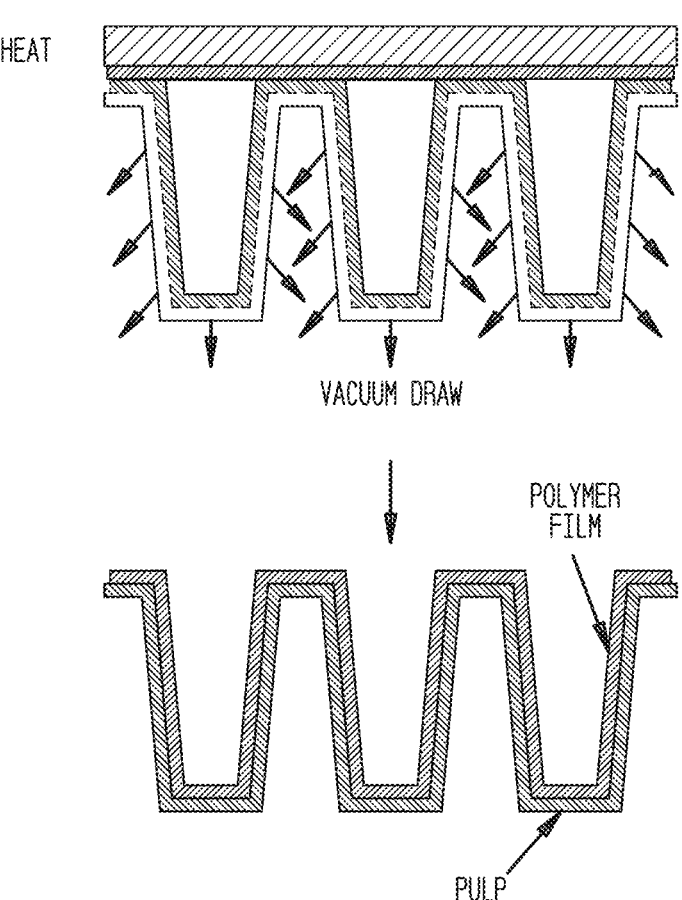

A molded pulp shell can be laminated by placing the molded pulp shell in a vacuum scaffold, and placing a polymer film over the molded pulp shell (FIG. 2A). The polymer film is then heated, and a vacuum is applied on the exterior of the pulp shell (FIG. 2B). As molded pulp shell is naturally porous, the vacuum would draw the heat softened the polymer film against and adhere to the molded pulp shell. The lamination process can be used to laminate a polymer film to the interior or exterior of the molded pulp shell.

The polymer layer can be laminated to the interior of the first and second pulp shells. When the first and second pulp shells are aligned and weld together, the polymer layer lining the interior of the formed cavity serving a water, moisture, or air barrier.

At least one of the first and second part shells can be laminated prior to connecting the part shells by ultrasonic welding. When the first and second part shells are stacked prior to ultrasonic welding, the at least one laminated layer is preferably located between the first and second rims.

In some embodiment, the polymer layer lines part of the pulp part shells, and at least one of the first and second rims of the first and second part shells.

Ultrasonic energy is applied for a period time sufficient for the welding of the first and second rims, typically for 1-60 seconds. Ultrasonic energy and duration depends on the sonotrode and size of the work piece. Typically, 0.1-6 bar of pressure, welding frequency is 15-50 KHz. Ultrasonic welding forms a fused junction between the first and second shells. The ultrasonic energy transiently soften or melts the polymer layer, along with the pressure provided during the welding process, the softened or melted polymer layer, at least partially permeates the first and second part shells.

When the ultrasonic energy is stopped or removed, the polymer re-hardens forming a fused junction.

The polymer film may comprise at least thermoplastic and/or bioplastic. Typical polymer film may be polyethylene terephthalate (PET), polypropylene (PP), polyethylene (PE), ethylene-vinyl alcohol (EVOH), polyamide (Nylon, PA), ionomers (EAA, EMAA), and ethylene vinyl acetate (EVA), polyacrylic acid (PAA), cellulose acetate, etc. Typical film thickness is typically 20-250 μm measured prior to laminating to the pulp shell. When laminated to the pulp shell, the thickness of the polymer layer may vary depending on the shape and depth of the pulp shell. The polymer film may comprise more than one layer, and the layer may comprise the same or different polymer.

The polymer film used for the lamination of the molded pulp shell can be metalized. The metalized layer may be coated on the exterior of a polymer layer or placed in between polymer layers. The addition of the metalized layer reduces the permeability of the film to light, water and oxygen. The metalized layer may comprise aluminum. Examples of such metalized polymer film is metalized PET. Typical film thickness is 20-250 μm prior to lamination to the pulp shell, the metalized layer is typically 2-10 μm. The polymer layer is typically metalized with aluminum. The polymer film may also comprise a plurality of polymer layers and at least one metalized layer. In some instances, the polymer layer may comprise a plurality of polymer layers and plurality of metalized layer.

The present invention also includes a molded pulp container, comprises a first molded pulp part shell, the first part shell has a first depression and a first rim, and a second molded pulp part shell, the second part shell comprising a second depression and a second rim. The first and second rims of the first and second part shells are aligned, and bonded to form a container. The first and second rims of the pulp container may be bonded by ultrasonic welding.

Similarly, at least one of the first and second part shells can have interior surfaces lined with a polymer film, which may extend to the first and second rims. Same polymer film as discussed in prior embodiments may be used with this particular embodiment. After ultrasonic welding, the first and second rims form a fused junction, wherein the polymer layer at least partially permeates the first and second part shells.

Figure 3:
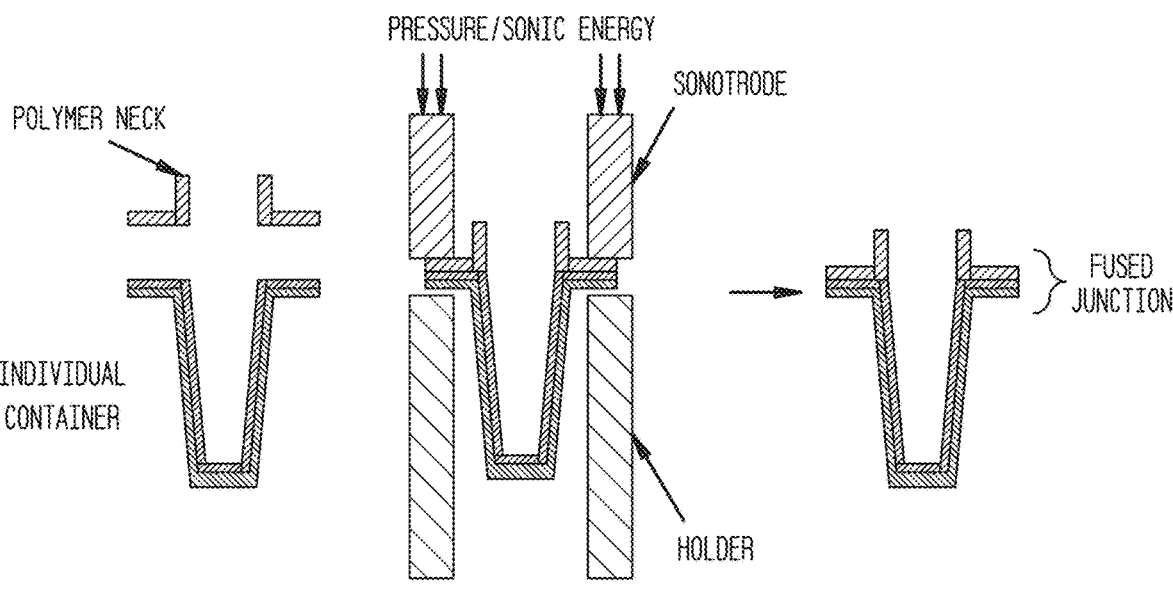
FIG. 3 illustrates an exemplary process of ultrasonic welding a polymer neck to a molded pulp container, creating a fused junction.
Figure 4:
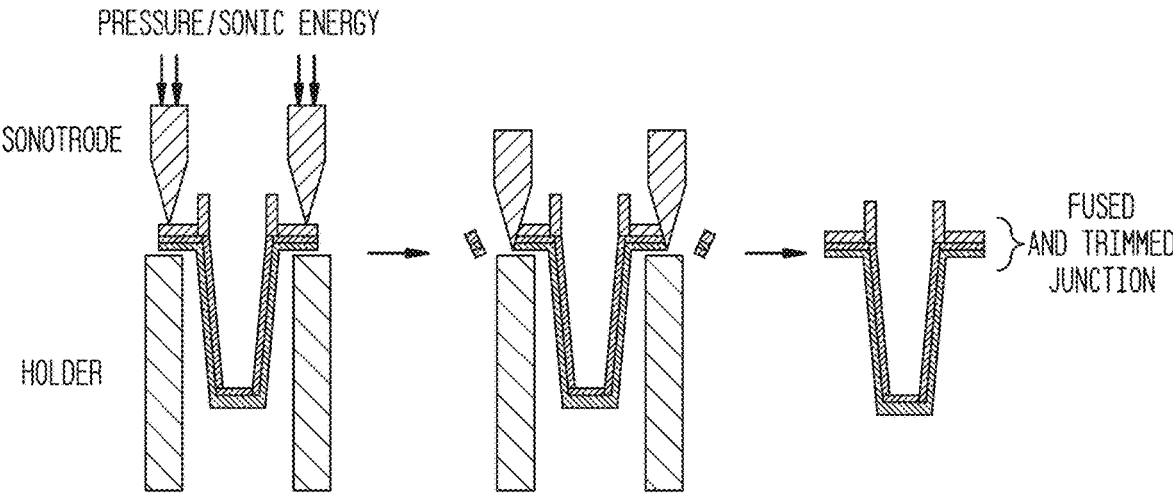
FIG. 4 illustrates an exemplary process of ultrasonic welding a polymer neck to a molded pulp container, and in the same process trimming excess materials from the junction, creating a fused junction with a finished edge.
Figure 5:
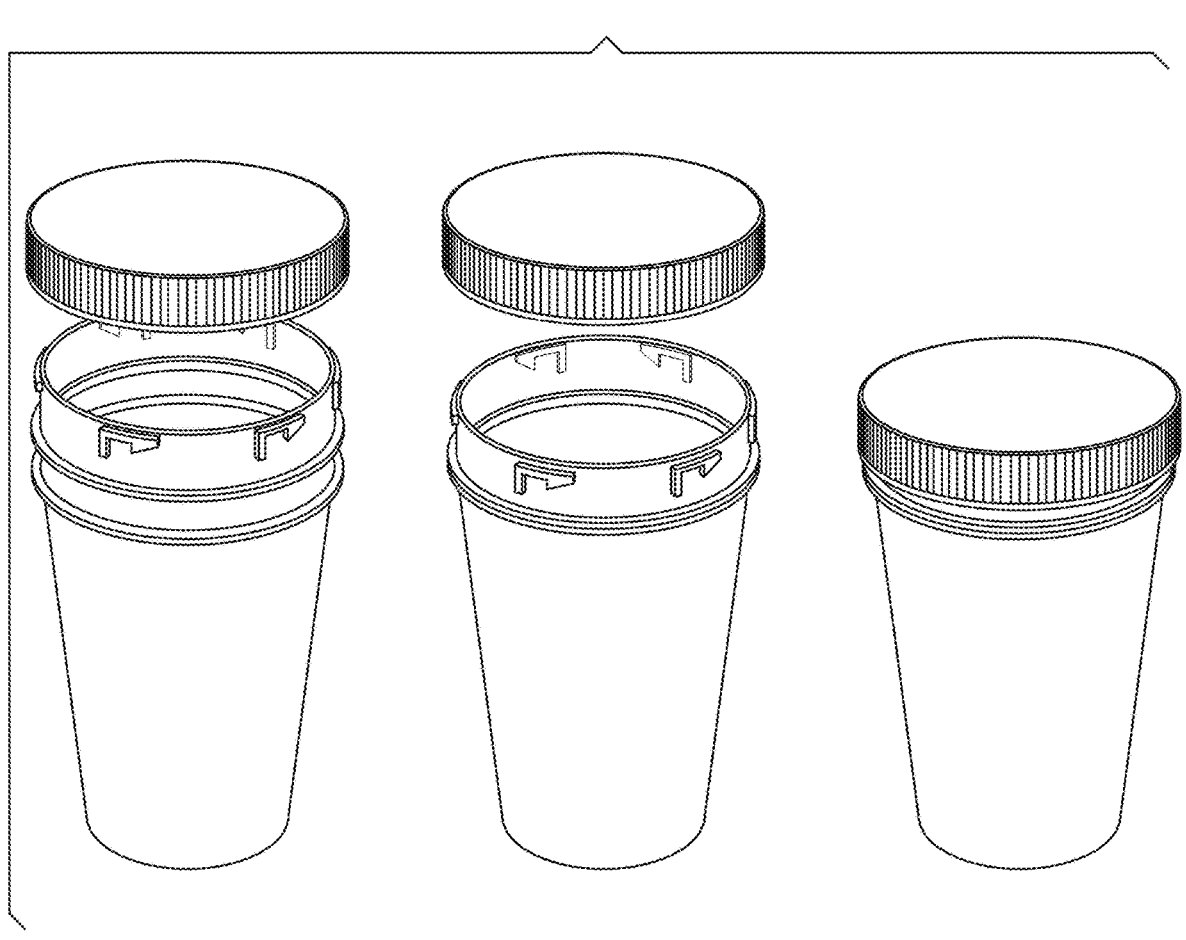
FIG. 5 illustrates views of an embodiment of the molded pulp container.
Figure 6:
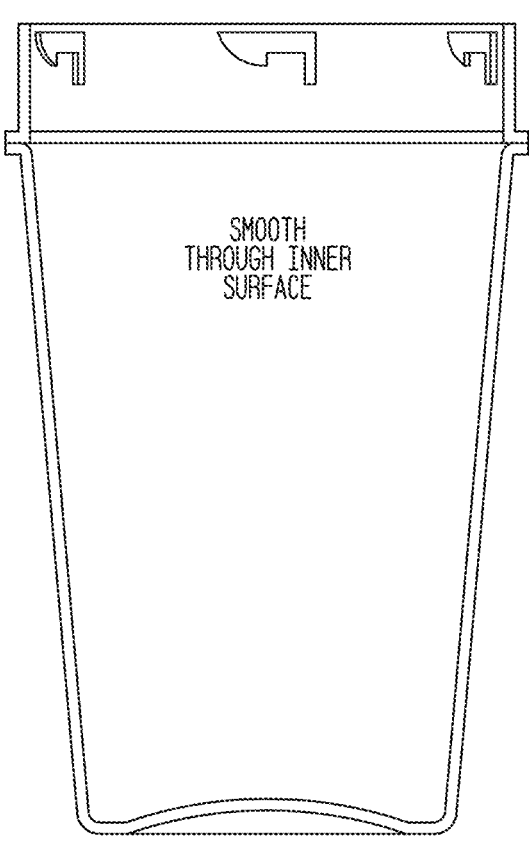
FIG. 6 shows a cross sectional view of the embodiment of the molded pulp container shown in FIG. 5.
Figure 7:
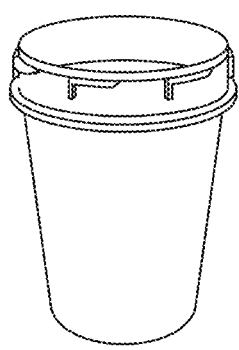
FIGS. 7 and 8 illustrate views of additional embodiments of the molded pulp container.
Figure 7:
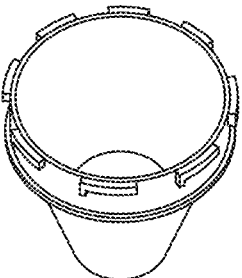
Figure 7:
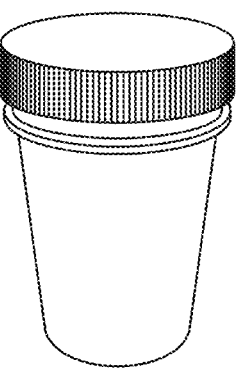
Figure 8:
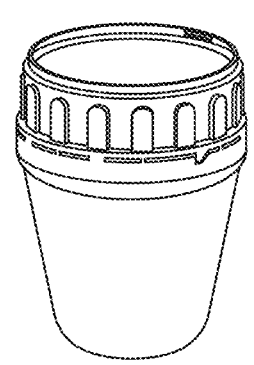
Figure 8:
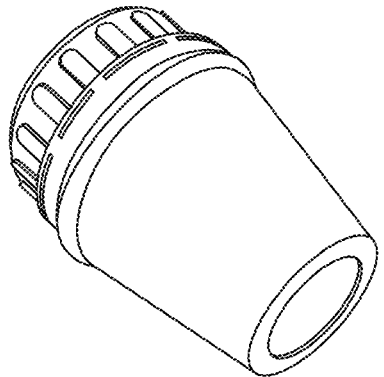
Figure 8:
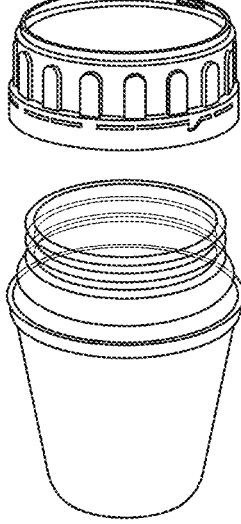

The present invention further includes a method of fabricating a pulp container (FIGS. 3 and 4), the method comprises the steps of generating a body, wherein the body comprising a bottom and at least one side wall forming a cavity, wherein the at least one side wall comprising a upper rim; generating a neck, wherein the neck comprising a upper closure part and a lower rim; aligning the upper rim of the at least one sidewall of the body and the lower rim of the neck; and welding the upper rim of the at least one sidewall of the body to the lower rim of the neck.

The welding of the upper rim of the sidewall of the body to the lower rim of the neck may be by ultrasonic welding. The ultrasonic welding may be conducted by means previously described. By choosing the appropriate shape of the sonotrode (e.g., edged or sharpened tip), the ultrasonic welding can simultaneously removes excess material from the first and second rim. This provides a finished exterior of the fused junction.

The neck may comprise at least thermoplastic and/or bioplastic. Specifically, the neck may comprise polyethylene terephthalate (PET), polypropylene (PP), polyethylene (PE), ethylene-vinyl alcohol (EVOH), polyamide (Nylon, PA), ionomers (EAA, EMAA), and ethylene vinyl acetate (EVA), polyacrylic acid (PAA), cellulose acetate, etc. The neck may be manufactured by injection molding or any other suitable means.

The body of the pulp container may have an interior surface laminated with a polymer film, which extends to the upper rim. Same polymer film as discussed in prior embodiments may be used with this particular embodiment. In some embodiment, the interior surface of the pulp container is partially lined with a polymer film, which includes the upper rim of the container. In other embodiments, the upper rim of the pulp container may be welded directly to a polymer neck.

The present invention also includes a pulp container comprises a molded pulp body, wherein the body comprising a bottom and at least one side wall forming a cavity, wherein the at least one side wall comprising a upper rim; a neck, wherein the neck comprising a upper closure part and a lower rim; wherein the upper rim of the at least one sidewall of the body and the lower rim of the neck are aligned and welded together. The pulp container can be completely or partially lined with a polymer layer, which extends to the upper rim. The pulp container may be welded by ultrasonic welding. The ultrasonic welding may be conducted by means previously described.

The neck of pulp container comprises at least thermoplastic and/or bioplastic, as previously described.

The interior surface of the body of the pulp container may be laminated with a polymer film, which extends to the upper rim. Same polymer film as discussed in prior embodiments may be used with this particular embodiment.

The pulp container may further comprise a cap capable of engaging the upper closure part of the neck. The cap can be a childproof cap. The pulp container may further comprise a tamper proof seal.

A method of joining a pulp component to a second component is also contemplated. The method comprises: 1) providing a pulp component comprising a flat first rim; 2) providing a second component comprising a flat second rim; 3) aligning the first rim with the second rim, wherein at least one of the first rim and the second rim comprising a polymer layer; and ultrasonic welding the first rim to the second rim.

The method contemplates that at least one of the first rim is coated with a polymer; the second rim is coated with a polymer; or the second component comprises a polymer.

In one particular implementation of the method, the second component comprises at least a part of wood product, paper, or pulp. The polymer coating at least one of the first rim or second rim comprises at least thermoplastic and/or bioplastic. The second component can comprise a at least thermoplastic and/or bioplastic.

The polymer comprises may comprise polyethylene terephthalate (PET), polypropylene (PP), polyethylene (PE), ethylene-vinyl alcohol (EVOH), polyamide (Nylon, PA), ionomers (EAA, EMAA), and ethylene vinyl acetate (EVA), polyacrylic acid (PAA), cellulose acetate, etc.

The ultrasonic welding can be by means previously described with parameters adjusted to suit the particular combination of components. The ultrasonic welding may be conducted by means previously described. By choosing the appropriate shape of the sonotrode (e.g., edged or sharpened tip), the ultrasonic welding can simultaneously removes excess material from the first and second rim. This provides a finished exterior of the fused junction.

A further embodiment of the present invention pulp container comprises a molded pulp body, wherein the body comprising a bottom and at least one side wall forming a cavity; at least one polymer layer bonded directly or indirectly to an interior surface of the body; and at least one metalized layer bonded directly or indirectly to the interior surface of the body.

The polymer film of the pulp container may be bond to the pulp body. Particularly, the metalized layer may be bond to the pulp body. The metalized layer may be bond to the polymer film. In another embodiment, the polymer film may comprise a plurality of polymer layers. The metalized layer is located between the polymer layers. Same polymer film composition as discussed in prior embodiments may be used with this particular embodiment.

It should be understood that modifications to the embodiments disclosed herein can be made to meet a particular set of design criteria. The particular configuration of type of such components can also be adjusted to meet a particular set of design criteria. Therefore, while certain exemplary embodiments of devices and methods of making and using the same have been discussed and illustrated herein, it is to be distinctly understood that the invention is not limited thereto but may be otherwise variously embodied and practiced within the scope of the following claims.

The invention claimed is:

1. A method of fabricating a pulp container, the method comprising:

generating a first part shell, wherein the first part shell comprising a first rim surrounding a first depression;

generating a second part shell, wherein the second part shell comprising a second rim surrounding a second depression;

laminating an interior surface of at least one of the first part shell and the second part shells with a polymer film, which extends to the first rim and the second rim;

aligning the first part shell and the second part shell, wherein the first rim and the second rim are aligned and the first depression and the second depression form a cavity, wherein aligning the first part shell and the second part shell placing the at least one interior surface laminated with the polymer film between a contact interface of the first rim and the second rim; and ultrasonic welding the first rim and the second rim forming a container.

2. The method recited in claim 1, wherein the first part shell and the second part shell comprise at least a part of wood product, paper, pulp, or molded pulp.

3. The method recited in claim 1, wherein the polymer film comprises at least one of thermoplastic or bioplastic, or a combination thereof.

4. The method recited in claim 1, wherein the polymer film comprises bio-degradable thermoplastic.

5. The method recited in claim 1, wherein the polymer film comprises at least one of polyethylene terephthalate (PET), polypropylene (PP), polyethylene (PE), ethylene-vinyl alcohol (EVOH), polyamide (Nylon, PA), ionomers (EAA, EMAA), ethylene vinyl acetate (EVA), polyacrylic acid (PAA), or cellulose acetate.

6. The method recited in claim 1, wherein generating the first part shell and the second part shell is by vacuum forming.

7. The method recited in claim 1, wherein laminating at least one of the first part shell and the second part shell is by heating a polymer film and applying vacuum on an exterior side of the at least one of the first part shell and the second part shell shells.

8. The method recited in claim 1, wherein the ultrasonic welding is by 0.1-6 bar of pressure, welding frequency is 15-50 KHz.

9. The method recited in claim 1, wherein the polymer film comprising a plurality of polymer layers.

10. The method recited in claim 1, wherein the polymer film is metalized.

11. The pulp container recited in claim 10, wherein metalized layer comprises Aluminum.

12. A method of joining a pulp component to a second component, comprising providing a pulp component comprising a flat first rim;

providing a second component comprising a flat second rim;

aligning the first rim with the second rim, wherein at least one of the first rim and the second rim comprising a polymer layer; and ultrasonic welding the first rim to the second rim.

13. The method of claim 12, wherein the first rim is coated with a polymer.

14. The method of claim 12, wherein the second component comprising at least a part of wood product, paper, or pulp.

15. The method of claim 14, wherein the second rim is coated with a polymer.

16. The method of claim 15, wherein the polymer comprises at least one of thermoplastic or bioplastic, or a combination thereof.

17. The method of claim 15, wherein the polymer comprises at least one of polyethylene terephthalate (PET), polypropylene (PP), polyethylene (PE), ethylene-vinyl alcohol (EVOH), polyamide (Nylon, PA), ionomers (EAA, EMAA), ethylene vinyl acetate (EVA), polyacrylic acid (PAA), or cellulose acetate.

18. The method of claim 12, wherein the second component comprising a polymer.

19. The method of claim 18, wherein the polymer comprises at least thermoplastic and/or bioplastic.

20. The method of claim 18, wherein the polymer comprises at least one of polyethylene terephthalate (PET), polypropylene (PP), polyethylene (PE), ethylene-vinyl alcohol (EVOH), polyamide (Nylon, PA), ionomers (EAA, EMAA), ethylene vinyl acetate (EVA), polyacrylic acid (PAA), or cellulose acetate.

21. The method of claim 12, wherein the ultrasonic welding is by 0.1-6 bar of pressure, welding frequency is 15-50 KHz.

22. The method of claim 12, wherein the ultrasonic welding simultaneously removes excess material from the first and second rim.

* * * * *